(12) United States Patent
Imura et al.

(10) Patent No.: US 8,275,249 B2
(45) Date of Patent: Sep. 25, 2012

(54) LENS BARREL, CAMERA AND LENS BARREL ADJUSTMENT DEVICE

(75) Inventors: Yoshio Imura, Kawasaki (JP); Akio Nishizawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/137,058

(22) Filed: Jul. 18, 2011

(65) Prior Publication Data

US 2011/0274419 A1 Nov. 10, 2011

Related U.S. Application Data

(63) Continuation of application No. 11/698,281, filed on Jan. 26, 2007, now abandoned.

(30) Foreign Application Priority Data

Jan. 26, 2006 (JP) .................................. 2006-017063

(51) Int. Cl.
 *G03B 17/00* (2006.01)
 *H04N 5/228* (2006.01)

(52) U.S. Cl. .......................... 396/55; 396/73; 348/208.11

(58) Field of Classification Search .................... 396/55, 396/73; 359/210, 557; 348/188, 208.11
See application file for complete search history.

(56) References Cited

U.S. PATENT DOCUMENTS

| | | | | |
|---|---|---|---|---|
| 5,053,800 A | 10/1991 | Ishida et al. | .................... | 396/91 |
| 5,082,360 A * | 1/1992 | Sato et al. | .................... | 359/675 |
| 5,740,471 A | 4/1998 | Terui | ............................... | 396/53 |
| 6,985,177 B2 | 1/2006 | Takahashi et al. | ....... | 348/208.99 |
| 7,450,833 B2 | 11/2008 | Nomura | ...................... | 396/55 |
| 7,619,654 B2 * | 11/2009 | Ito et al. | .................... | 348/208.12 |
| 2004/0252195 A1 * | 12/2004 | Lu et al. | ........................ | 348/188 |
| 2005/0036777 A1 | 2/2005 | Nomura et al. | ................. | 396/73 |
| 2006/0083503 A1 | 4/2006 | Fukai | .............................. | 396/55 |
| 2006/0127072 A1 * | 6/2006 | Seo | ................................. | 396/55 |

FOREIGN PATENT DOCUMENTS

| | | |
|---|---|---|
| JP | 2000-019575 | 1/2000 |
| JP | 2000-221557 | 8/2000 |
| JP | 2003-015178 | 1/2003 |
| JP | 2003-315861 | 11/2003 |
| JP | 2004-233922 | 8/2004 |

OTHER PUBLICATIONS

U.S. Appl. No. 11/698,281, filed Jan. 26, 2007, Yoshio Imura et al., Nikon Corporation.

(Continued)

*Primary Examiner* — Clayton E LaBalle
*Assistant Examiner* — Noam Reisner

(57) ABSTRACT

A lens barrel comprises a fixed optical system though which a subject image enters into the lens barrel along with an optical axis, a retreatable blur correction optical system that corrects an image blur by moving within a plane ranging perpendicular to the optical axis in an operating position and that retreats to a storage position from the operating position, a blur correction optical system drive unit that drives the retreatable blur correction optical system within the plane ranging perpendicular to the optical axis, and a correction information recording unit at which reference position correction information is recorded, the correction information indicating a reference position for the retreatable blur correction optical system within the plane ranging perpendicular to the optical axis.

8 Claims, 11 Drawing Sheets

OTHER PUBLICATIONS

Office Action mailed from the Unites States Patent and Trademark Office on Mar. 10, 2009 in the related U.S. Appl. No. 11/698,281.
Office Action mailed from the Unites States Patent and Trademark Office on Nov. 2, 2009 in the related U.S. Appl. No. 11/698,281.
Office Action mailed from the Unites States Patent and Trademark Office on Apr. 20, 2010 in the related U.S. Appl. No. 11/698,281.
Office Action mailed from the Unites States Patent and Trademark Office on Jan. 18, 2011 in the related U.S. Appl. No. 11/698,281.

* cited by examiner

LENS BARREL, CAMERA AND LENS BARREL ADJUSTMENT DEVICE

CROSS-REFERENCE TO RELATED APPLICATIONS

This application is a continuation of and claims priority benefit to U.S. patent application Ser. No. 11/698,281, filed Jan. 26, 2007, now abandoned, which application in turn is based upon and claims the benefit of priority under 35 U.S.C. §119 to Japanese Patent Application No. 2006-017063 filed Jan. 26, 2006, the entire contents of which are incorporated herein by reference.

BACKGROUND OF THE INVENTION

1. Field of the Invention

The present invention relates to a lens barrel equipped with a retreatable optical system that retreats from a position on the optical axis for storage, a camera that includes the lens barrel and an adjustment device that adjusts the lens barrel.

2. Description of Related Art

Japanese Laid Open Patent Publication No. 2003-315861 discloses a retractable lens barrel used in photographing operation executed in a camera. The length of this lens barrel in storage is reduced by allowing some of a plurality of lens groups to move (slide) rotationally around a rotating shaft fixed to the lens barrel so as to retreat along a direction extending perpendicular to the optical axis and storing the other lens groups into the space thus created.

The lens barrels used in photographing operations executed in cameras in the related art include those equipped with optical blur correction devices. A blur correction device detects a vibration to which the optical system has been subjected via an angular speed sensor or the like and reduces the extent of an image blur manifesting on the image forming plane by driving some (blur correction lens group) of a plurality of lens groups within a plane ranging perpendicular to the optical axis based upon the extent of vibration thus detected.

Japanese Laid Open Patent Publication No. 2004-233922 discloses an example of a lens barrel in the related art, which includes a lens group made to retreat away from the optical axis. Decentering may occur in this lens barrel due to inconsistent accuracy in mechanical portions and the like used in the retreating operation, and for this reason, it includes an aligning mechanism that displaces the lens group by shifting it along a direction perpendicular to the optical axis so as to reduce the extent of the decentering.

However, the addition of the aligning mechanism leads to an increase in the number of required parts, resulting in a lens barrel with a more complex structure. The addition of an aligning mechanism becomes particularly problematic in the case of a lens barrel equipped with a blur correction device, since the sufficient installation space for the aligning mechanism needs to be secured in the already tight available space.

According to the first aspect of the invention, a lens barrel comprises: a fixed optical system through which a subject image enters into the lens barrel along with an optical axis; a retreatable blur correction optical system that corrects an image blur by moving within a plane ranging perpendicular to the optical axis in an operating position and that retreats to a storage position from the operating position; a blur correction optical system drive unit that drives the retreatable blur correction optical system within the plane ranging perpendicular to the optical axis; and a correction information recording unit at which reference position correction information is recorded. The correction information indicates a reference position for the retreatable blur correction optical system within the plane ranging perpendicular to the optical axis.

According to the second aspect of the invention, a lens barrel comprises: a fixed optical system though which a subject image enters into the lens barrel along with an optical axis; a blur correction optical system supported so as to be allowed to move within a plane ranging perpendicular to the optical axis to correct an image blur; a retreatable optical system that moves between an operating position and a stored position away from the optical axis, the retreatable optical system being constituted with either an optical system independent of the blur correction optical system or an optical system constituting part of the blur correction optical system; a blur correction optical system drive unit that drives the blur correction optical system within the plane ranging perpendicular to the optical axis; and a correction information recording unit at which reference position correction information is recorded. The correction information indicates a reference position for the blur correction optical system within the plane ranging perpendicular to the optical axis.

The reference position may be a position where the optical axis of the retreatable blur correction optical system or the blur correction optical system substantially coincides with the optical axis of the fixed optical system.

It is preferred that the correction information recording unit provides the correction information to an information acquisition device disposed at a camera body on which the lens barrel is mounted.

A camera according to another aspect of the invention comprises: a fixed optical system through which a subject image enters into a lens barrel along with an optical axis; a retreatable blur correction optical system that corrects an image blur by moving within a plane ranging perpendicular to the optical axis in an operating position and that retreats to a storage position from the operating position; a blur correction optical system drive unit that drives the retreatable blur correction optical system within the plane ranging perpendicular to the optical axis; and a correction information recording unit at which reference position correction information is recorded. The correction information indicates a reference position for the retreatable blur correction optical system within the plane ranging perpendicular to the optical axis.

A camera according to another aspect of the invention comprises: a fixed optical system though which a subject image enters into a lens barrel along with an optical axis; a blur correction optical system supported so as to be allowed to move within a plane ranging perpendicular to the optical axis to correct an image blur; a retreatable optical system that moves between an operating position and a stored position away from the optical axis, the retreatable optical system being constituted with either an optical system independent of the blur correction optical system or an optical system constituting part of the blur correction optical system; a blur correction optical system drive unit that drives the blur correction optical system within the plane ranging perpendicular to the optical axis; and a correction information recording unit at which reference position correction information is recorded. The correction information indicates a reference position for the blur correction optical system within the plane ranging perpendicular to the optical axis.

The camera may further comprises: an imaging device that captures a subject image entering thereto via the lens barrel and outputs an image signal, and the correction information recorded at the correction information recording unit may be generated based upon an output from the imaging device.

According to another aspect of the invention, it is preferred that the retreatable blur correction optical system or the retreatable optical system is configured to swing from the operating position to the storage position around the optical axis as the lens barrel retracts into a camera body.

A lens barrel adjustment device according to the present invention, uses to adjust the lens barrel noted above. The lens barrel adjustment device comprises: an imaging device that captures a subject image formed via the lens barrel and outputs an image signal; a correction information generation unit that evaluates an image signal output from the imaging device while displacing the retreatable blur correction optical system or the blur correction optical system by controlling the blur correction optical system drive unit at the lens barrel and generates reference position correction information indicating a reference position for the retreatable blur correction optical system or the blur correction optical system to be assumed within the plane perpendicular to the optical axis; and a recording unit that records the correction information output by the correction information generation unit into a recording medium disposed within the lens barrel.

DESCRIPTION OF EMBODIMENTS

First Embodiment

The following is an explanation of the camera achieved in the first embodiment of the present invention.

Figure 1A:
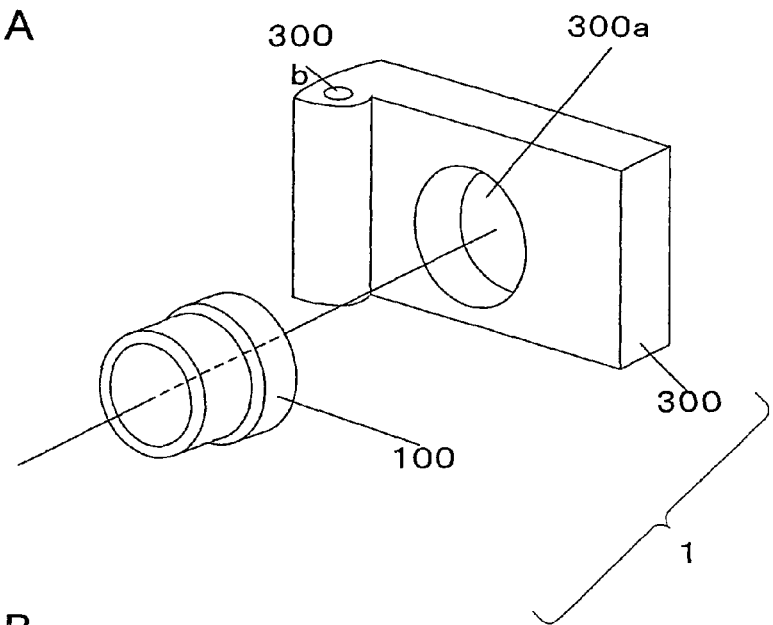
FIG. 1 illustrates the camera achieved in a first embodiment of the present invention, with FIG. 1A presenting an external view of the camera and FIG. 1B presenting a sectional view of the lens barrel in a wide-angle photographing state.

As shown in FIG. 1A, the camera in the first embodiment may be a digital still camera. The digital still camera in the figure includes a camera body 300 and a lens barrel 100, which is inserted and fixed at an opening 300a formed at the camera body 300 and is equipped with an optical blur correction device. It is to be noted that reference numeral 300b indicates a shutter release button.

Figure 1B:
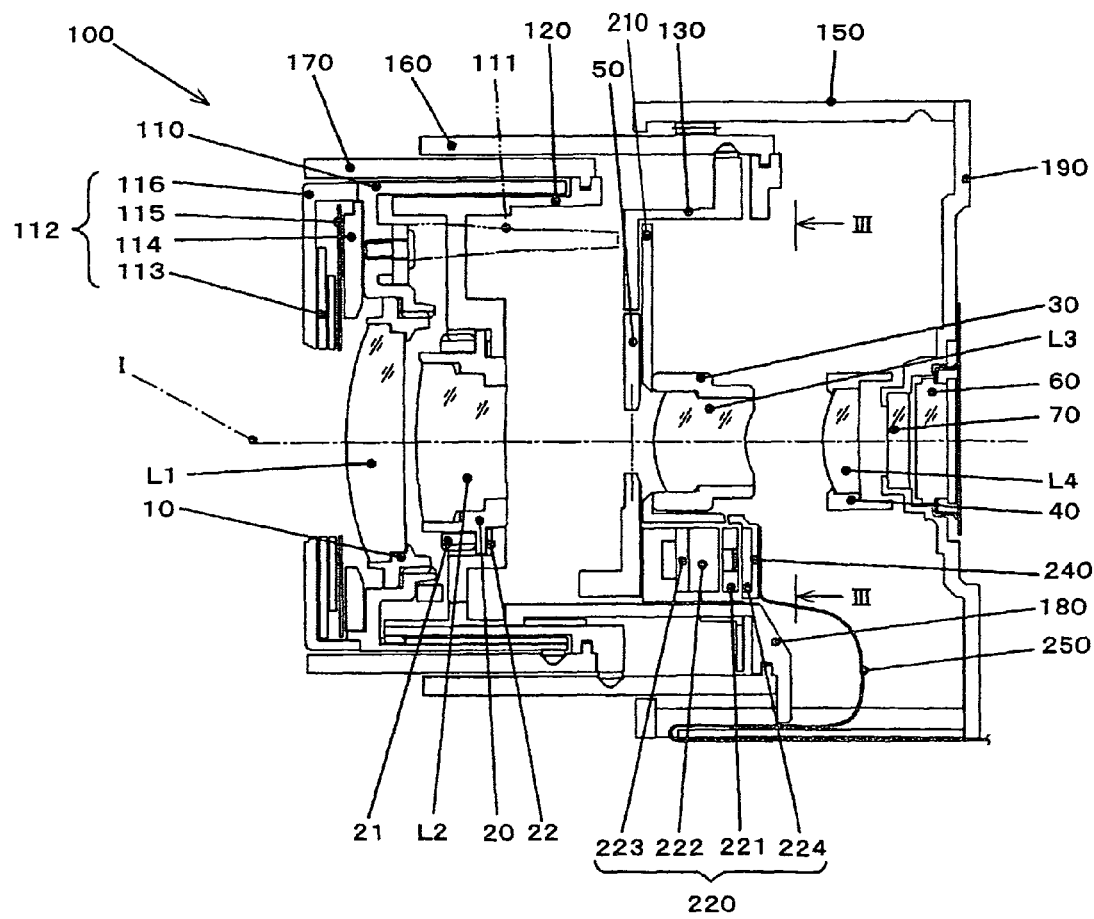
Figure 2:
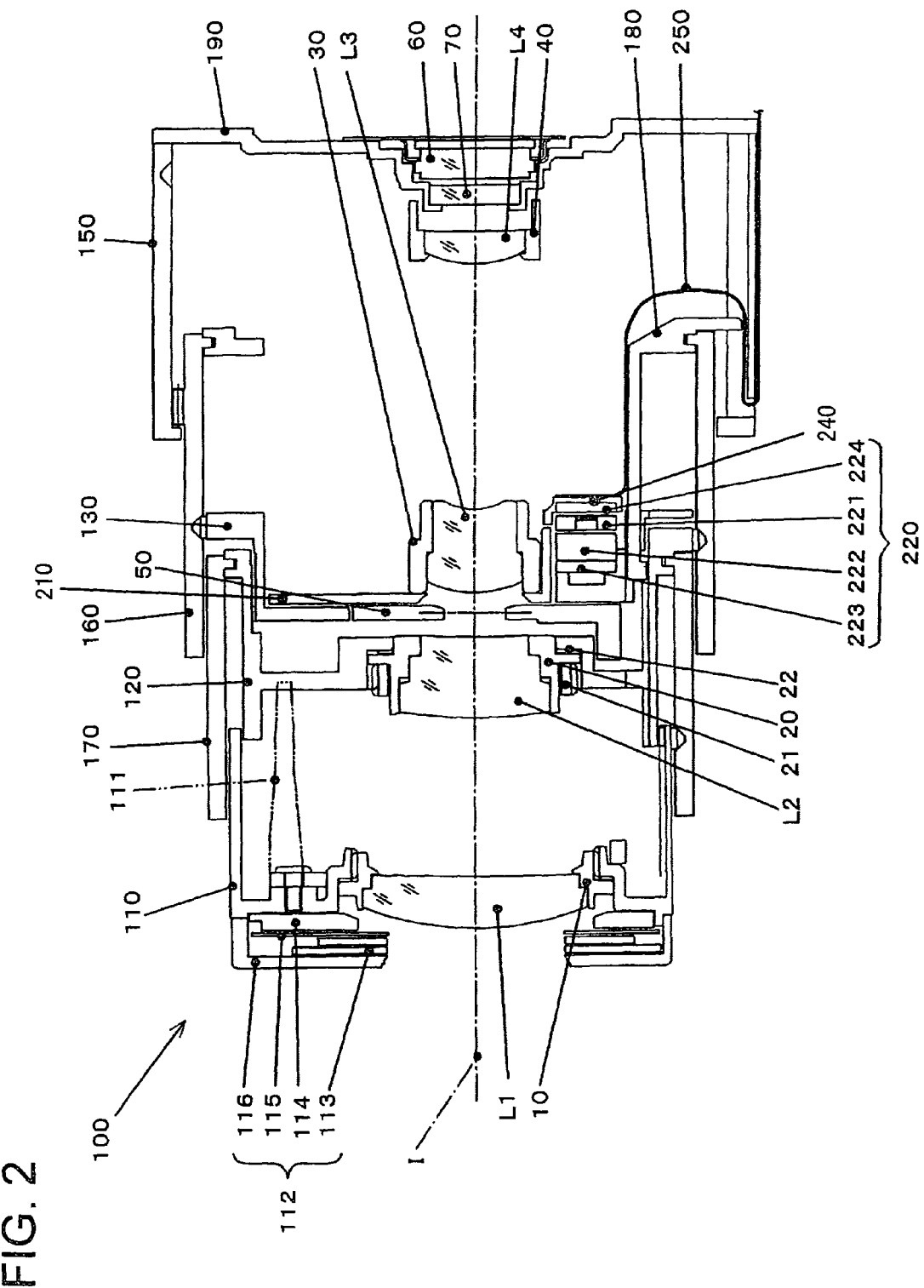
FIG. 2 is a sectional view of the lens barrel in FIG. 1 in a telephoto photographing state.
Figure 3:
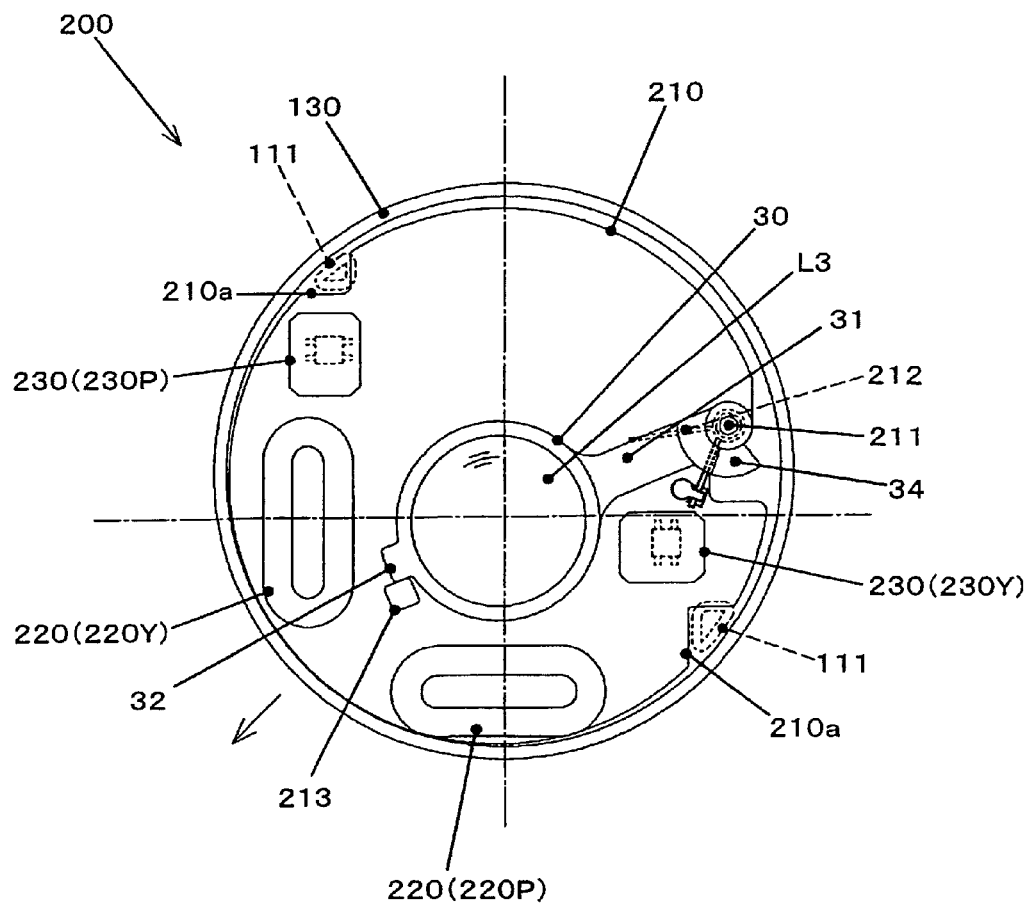
FIG. 3 is a sectional view taken along III-III in FIG. 1 in the direction of the arrows.

FIG. 1B is a sectional view of the lens barrel in the first embodiment in a wide-angle photographing state (operating state). FIG. 2 is a sectional view of the lens barrel in the telephoto photographing state and FIG. 3 is a sectional view taken along III-III in FIG. 1 in the direction of the arrows.

The lens barrel 100 includes photographic lens group which may be zoom lens groups constituted with, for instance, four lens groups. These photographic lens groups include a first lens group L1, a second lens group L2, a blur correction lens group (third lens group) L3 and a fourth lens group L4, disposed in this order starting from the subject side (hereafter referred to as an objective side) along an optical axis I in the photographing state. The first lens group L1 and the second lens group L2 are each a zooming lens group that moves along the optical axis I to adjust the focal length of the photographic lens groups and are respectively fixed in a first lens group chamber 10 and a second lens group chamber 20, each of which includes an annular lens frame. It is to be noted that the blur correction lens group L3 and the fourth lens group L4 also function as zooming lenses and move along the optical axis I.

The blur correction lens group L3 displaces itself by shifting within a plane ranging substantially perpendicular to the optical axis I in correspondence to a vibration to which the lens barrel 100 has been subjected, so as to reduce the extent of image blur occurring at the image forming plane. The blur correction lens group L3 is fixed in a blur correction lens group chamber 30, which includes an annular lens frame, and the blur correction lens group chamber 30, in turn, is supported at a vibration frame 210 of a blur correction unit 200 to be detailed later. It is to be noted that unlike the blur correction lens group L3, the lens groups L1, L2 and L4 are fixed optical systems which do not undergo such displacement, maintaining fixed positions relative to the optical axis I.

The fourth lens group L4 is a focusing lens group that adjusts the photographing distance (focusing position) of the photographic lens groups as it moves along the optical axis I, and is fixed in a fourth lens group chamber 40, which includes an annular lens frame. The fourth lens group chamber 40 is driven along the optical axis I under AF control of the known art executed by using a focusing mechanism (not shown).

A shutter unit 50, a CCD 60 and a low pass filter (LPF) 70 are mounted in the lens barrel 100. The shutter unit 50, disposed on the light-entry side of the blur correction lens group L3, adjusts the exposure quantity indicating the extent of exposure at the CCD 60. The shutter unit 50 includes a shutter portion constituted with a plurality of thin plastic pieces. The CCD 60 is a solid imaging element that converts an image formed via the photographic lens groups to electrical signals and outputs the electrical signals, and is disposed on the light exit side of the fourth lens group L4. The LPF 70 is an optical filter provided so as to prevent moiré from manifesting in the captured image and is disposed between the fourth lens group L4 and the CCD 60.

The lens barrel 100 further includes a first lens group barrel 110, a second lens group holding frame 120, a blur correction lens group holding frame 130, a fixed barrel 150, a first cam barrel 160, a second cam barrel 170, a linear guide key 180 and a CCD stage 190.

The first lens barrel chamber 10 is fixed inside of the first lens group barrel 110 formed in a substantially cylindrical shape. The first lens group barrel 110 is inserted inside of the second cam barrel 170. The first lens group barrel 110 is allowed to move along the optical axis I via a cam mechanism formed between itself and the second cam barrel 170 when the lens barrel 100 shifts from the photographing state to the stored state or when the focal length is being adjusted. As shown in FIGS. 1A, and 1B and 2, the first lens group barrel 110 assumes a position at the front end of the lens barrel 100 toward the objective side in the photographing state.

The first lens group barrel 110 is equipped with a guide member 111 and a lens barrier unit 112. The guide member 111 guides the vibration frame 210 of the blur correction unit 200 to be described in detail later. The guide member 111 is disposed over an area located on the outside of the first lens group L1 at the end surface of the first lens group barrel 110 toward the objective side, so as to project out toward the image side along the optical axis I. The guide member 111 assumes a tapered shape so as to become gradually thinner toward its front end side (toward the image). The guide operation executed via this guide member 111 is to be explained later.

The lens barrier unit 112, disposed on the objective side of the first lens group L1, protects the surface of the first lens group L1 on the entry side while the lens barrel 100 is in the stored state. The lens barrier unit 112, comprising a barrier 113, a barrier drive ring 114, a barrier receptacle 115 and a barrier cover 116, is fixed at the end of the first lens group barrel 110 on the objective side.

The second lens group holding frame 120, which is a frame structure mounted on the outside of the second lens group chamber 20, is inserted on the inside of the first lens group barrel 110. The second lens group holding frame 120 is allowed to move along the optical axis I independently of the first lens group barrel 110 via a cam mechanism formed between itself and the first cam barrel 160 when the lens barrel 100 shifts from the photographing state to the stored state or vice versa, or when the focal length is being adjusted. The second lens group chamber 20 includes a flange portion formed as a projecting collar at its outer circumferential surface and is fastened onto the second lens group holding frame 120 via a nut 21 at the flange portion. An adjustment washer 22 used to fine-adjust the position of the second lens group L2 is disposed at the surface of the flange portion on the side opposite from the nut 21.

The blur correction lens group holding frame 130 is a frame structure that holds the blur correction unit 200 which includes the blur correction lens group L3 and the blur correction lens group chamber 30. The blur correction lens group holding frame 130 is inserted on the inside of the first lens group barrel 110. The blur correction lens group holding frame 130 is allowed to move along the optical axis I via a cam mechanism formed between itself and the first cam barrel 160 as the lens barrel 100 shifts from the photographing state to the stored state or vice versa.

The fixed barrel 150, formed in a substantially cylindrical shape constitutes the base portion of the lens barrel 100 and is fixed onto the camera body (not shown) and is disposed on the outermost side at the lens barrel 100. The first cam barrel 160 and the second cam barrel 170, each formed in a cylindrical shape, are allowed to rotate around the optical axis I relative to the fixed barrel 150 via an interlocking mechanism (not shown).

The first cam barrel 160 is inserted on the inside of the fixed barrel 150. A cam follower formed at the outer circumferential surface of the first cam barrel 160 is inserted in a cam groove formed at the inner circumferential surface of the fixed barrel 150. Cam followers formed at the second lens holding frame 120 and the blur correction lens group holding frame 130 are inserted in cam grooves formed at the inner circumferential surface of the first cam barrel 160. The second cam barrel 170 is inserted further on the inside of the first cam barrel 160, and the first lens group barrel 110 is inserted on the inside of the second cam barrel 170. A cam follower formed on the outer circumferential surface of the first lens group barrel 110 is inserted in a cam groove formed at the inner circumferential surface of the second cam barrel 170.

The linear guide key 180 linearly guides the first lens group barrel 110, the second lens group holding frame 120 and the blur correction lens group holding frame 130 along the optical axis I relative to the fixed barrel 150, regardless of whether or not the first cam barrel 160 and the second cam barrel 170 are rotating. The CCD stage 190, fixed at the end of the fixed barrel 150 toward the image along the optical axis I, closes off the opening end of the fixed barrel 150. The CCD 60 and the LPF 70 are fixed onto the CCD stage 190.

The blur correction unit 200 includes the vibration frame 210, a voice coil motor (VCM) 220, a position detector 230, a blur correction unit cover 240 and a flexible printed circuit board (FPC) 250.

As shown in FIG. 3, the vibration frame disposed at the surface of the blur correction lens group holding frame 130 toward the image, is supported so as to move parallel to the blur correction lens group holding frame 130 within a plane ranging perpendicular to the optical axis I. The vibration frame 210 is a drive target member that is driven within the plane perpendicular to the optical axis I under blur correction control of the known art. The vibration frame 210 includes a recessed portion 210a formed by recessing its outer circumferential edge. The guide member 111 mentioned earlier is inserted in the recessed portion 210a.

A rotating shaft 211, a spring 212 and a rotation stopper 213 are mounted at the vibration frame 210. The rotating shaft 211, formed as a pin projecting out from the surface of the vibration frame 210 toward the image along the optical axis I, axially supports the front end of an arm portion 31 formed to radially extend from the outer circumferential surface of the blur correction lens group chamber 30 the outside thereof, so as to allow the arm portion 31 to rotate or swing as necessary. The central axis of the rotating shaft 211 is set so as to extend substantially parallel to the optical axis I. In addition, the rotating shaft 211 is disposed further upward relative to the optical axis I along a diagonal direction within a plane of the vibration frame 210 ranging perpendicular to the optical axis in a normal photographing state. It is to be noted that the term "normal photographing state" used in the description refers to a state in which photographing operation is executed by setting the optical axis I and the longitudinal side of the image plane substantially horizontal.

The spring 212 is, held between the rotating shaft 211 and the arm portion 31, and applies a rotational force to the blur correction lens group chamber 30 in a specific direction (in the counterclockwise direction viewed from the image side along the optical axis I in the embodiment) around the rotating shaft 211, relative to the vibration frame 210. The rotation stopper 213 is constituted with a projected portion projecting out from the surface of the vibration frame 210 and regulates the rotation of the blur correction lens group chamber 30 caused by the force applied from the spring 212, as it comes in contact with a projected portion 32 at the blur correction lens group chamber 30. The projected portion 32 is formed on the outer peripheral surface of the blur correction lens group chamber 30 at a position achieving substantial symmetry with the position of the arm portion 31 relative to the optical axis.

At the area where the arm portion 31 connects with the rotating shaft 211, a cam face portion 34 is formed to range around the circumference of the rotating shaft 211. The cam face portion 34 is formed so as to range spirally relative to the rotating shaft 211. In other words, the height of the cam face portion 34 measured along the length of the rotating shaft 211 continuously changes in correspondence to the angle measured around the circumference of the rotating shaft. As the lens barrel 100 shifts from the photographing state to the stored state, the blur correction lens group chamber 30 causes a pin 33 fixed at the CCD stage 190 to press down on the cam face portion 34. As the pin 33 slides along the sloped surface of the cam face portion 34, the arm portion 31 having the cam face portion 34 rotates around the rotating shaft 211 against the force applied from the spring 212. As a result, the blur correction lens group chamber 30 rotates along the clockwise direction around the rotating shaft 211.

The VCM 220 is an actuator that drives the vibration frame 210 along the direction extending perpendicular to the optical axis I in response to a control signal provided by a blur correction control unit (not shown). The VCM 220 includes a coil 221, a magnet 222 and yokes 223 and 224, as shown in FIGS. 1 and 2. The coil 221 is fixed to the vibration frame 210. The magnet 222 is a permanent magnet fixed onto the blur correction lens group holding frame 130 at a position facing opposite the coil 221. The yoke 223 is fixed to the surface of the magnet 222 on the side opposite from the coil 221. The yoke 224 is fixed to the blur correction unit cover 240 so as to face opposite the surface of the coil 221 on the side opposite from the magnet 222. The blur correction unit cover 240 is disposed at the vibration frame 210 further toward the image side and fixed to the blur correction lens group holding frame 130.

The blur correction unit 200 in the first embodiment corrects blurring attributable to pitching and yawing occurring at the lens barrel 100 and includes VCMs 220 each used to drive the vibration frame 210 to correct the blur caused by pitching or yawing. In the following explanation, the VCM that drives the vibration frame 210 to correct the pitching blur is referred to by attaching the suffix P and the VCM 220 that drives the vibration frame 210 to correct the yawing blur is referred to by attaching the suffix Y (suffixes are likewise attached to position detectors 230 to be described later).

As shown in FIG. 3, the VCM 220P is disposed further downward along the optical axis I in the regular photographing state. The VCM 220Y is set at a side of the optical axis I in the normal photographing state, at a position distanced from the VCM 220P by 90° around the optical axis I.

The position detectors 230 each include a Hall element fixed to the vibration frame 210 and a magnet fixed to the blur correction lens group holding frame 130. The Hall element detects the intensity of the magnetic field, which changes as the vibration frame 210 becomes displaced relative to the blur correction lens group holding frame 130. The position detectors 230 each detect the position of the vibration frame 210 relative to the blur correction lens group holding frame 130 based upon the change in the detected magnetic field intensity. The position detector 230P is disposed over an area above the VCM 220Y in the normal photographing state. The position detector 230Y is disposed over an area on the opposite side of the optical axis I relative to the VCM 220Y.

Through the FPC 250 which is disposed so as to bridge the space between the fixed barrel 150 and the vibration frame 210, power is supplied to the coils 221 at the VCMs 220 and output signals from the Hall elements at the position detectors 230 are transmitted.

The operation executed as the lens barrel 100 in the first embodiment shifts from the photographing state to the stored state is explained.

Figure 4:
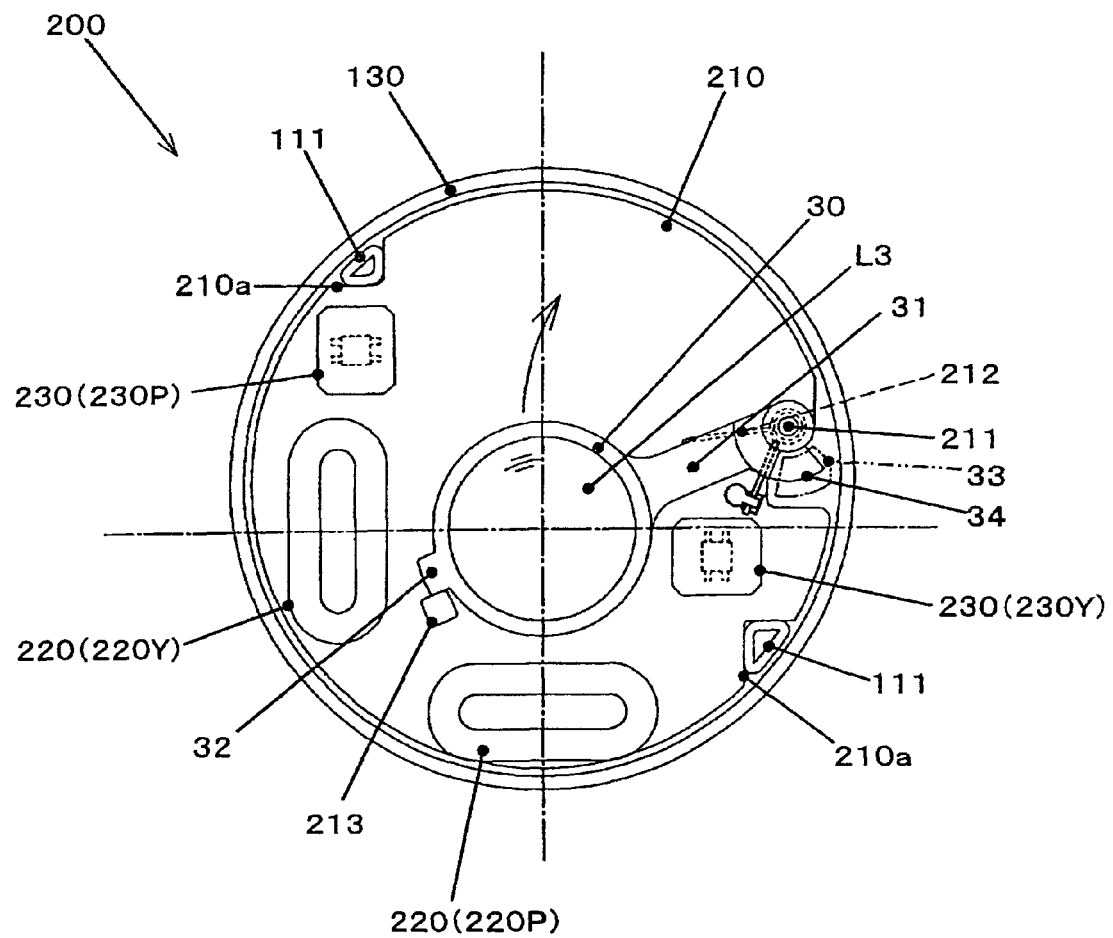
FIG. 4 is a lateral sectional view of the lens barrel in FIG. 1 shifting from the photographing state to a stored state.

FIG. 4 is a lateral section of the lens barrel 100 shifting from the photographing state to the stored state. The lens barrel 100 first rotationally drives the first cam barrel 160 and the second cam barrel 170 to move the first lens group barrel 110 in the second lens group holding frame 130 toward the image along the optical axis I. As the first lens group barrel 110 moves, the relative distance between the guide member 111 fixed to the first lens group barrel 110 and the vibration frame 210, measured along the optical axis I, become smaller. Then, as the interval between the first lens group L1 and the third lens group L3 becomes smaller than the minimum value assumed in the photographing state, the guide member 111 is inserted at the recessed portion 210a formed at the vibration frame 210 of the blur correction unit 200.

As explained earlier, the guide member 111 assumes a tapered shape, gradually becoming thicker from its front end (the image side along the optical axis I) toward its base side (toward the first lens group barrel 110), and has a sloped surface inclined relative to the optical axis I. The guide member 111 adopting this structure can be inserted at the vibration frame 210 over a significant depth and as the guide member 111 slides against the inner surface of the recessed portion 210a, it becomes displaced within the plane ranging perpendicular to the optical axis I. Ultimately, the vibration frame 210 becomes held in the state in which the optical axis of the blur correction lens group L3 is substantially aligned (centered) with the optical axis of the other lens groups (see FIG. 4).

After the blur correction lens group L3 becomes held in the centered state as described above, the first cam barrel 160 is rotationally driven continuously, and thus, the blur correction lens group holding frame 130 starts to move toward the image along the optical axis I. As the blur correction lens group holding frame moves toward the image, the pin 33 fixed to the CCD stage 190 presses against the cam face portion 34 at the blur correction lens group chamber 30.

Figure 5:
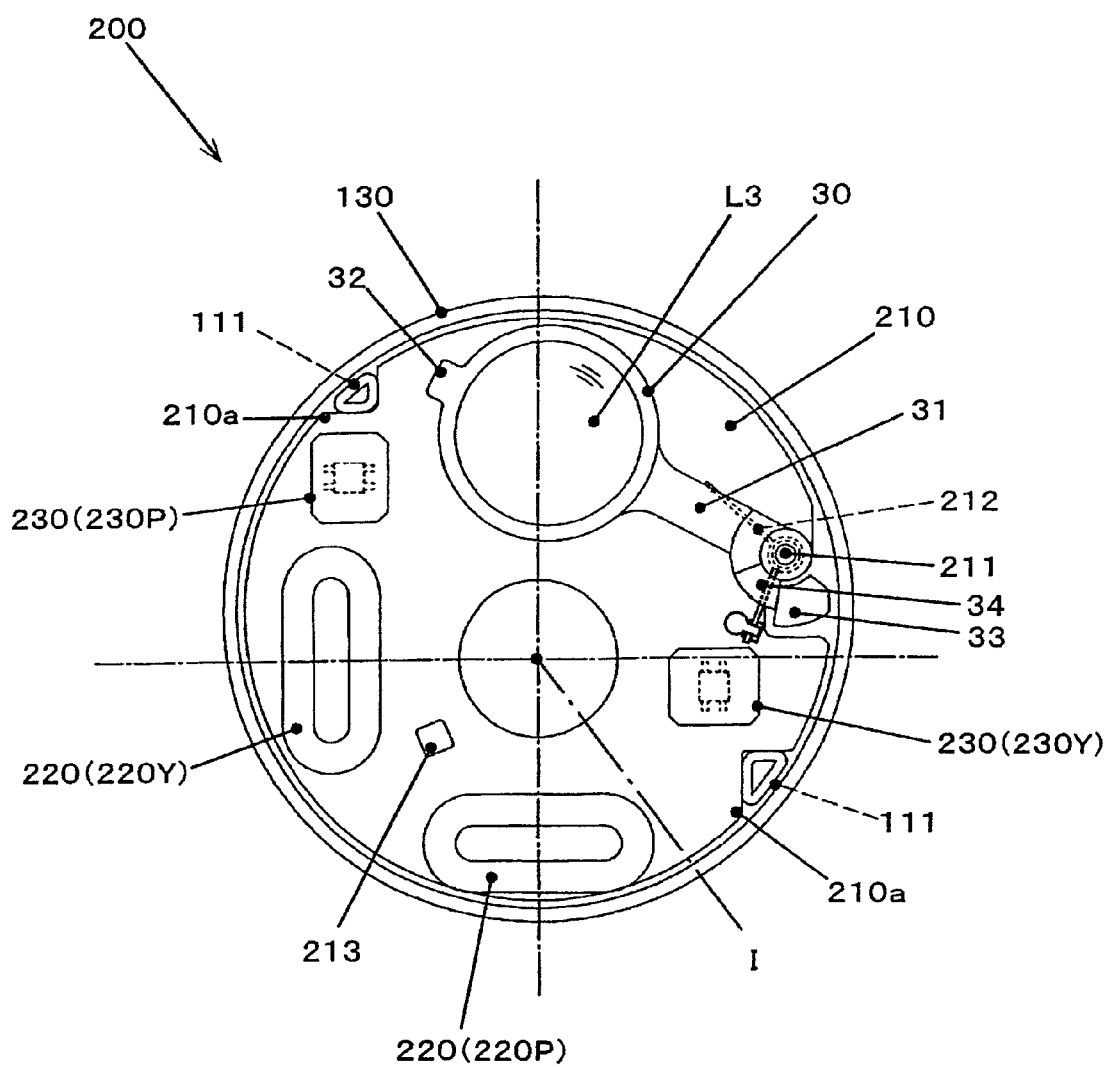
FIG. 5 is a lateral sectional view of the lens barrel in FIG. 1 in the stored state.
Figure 6:
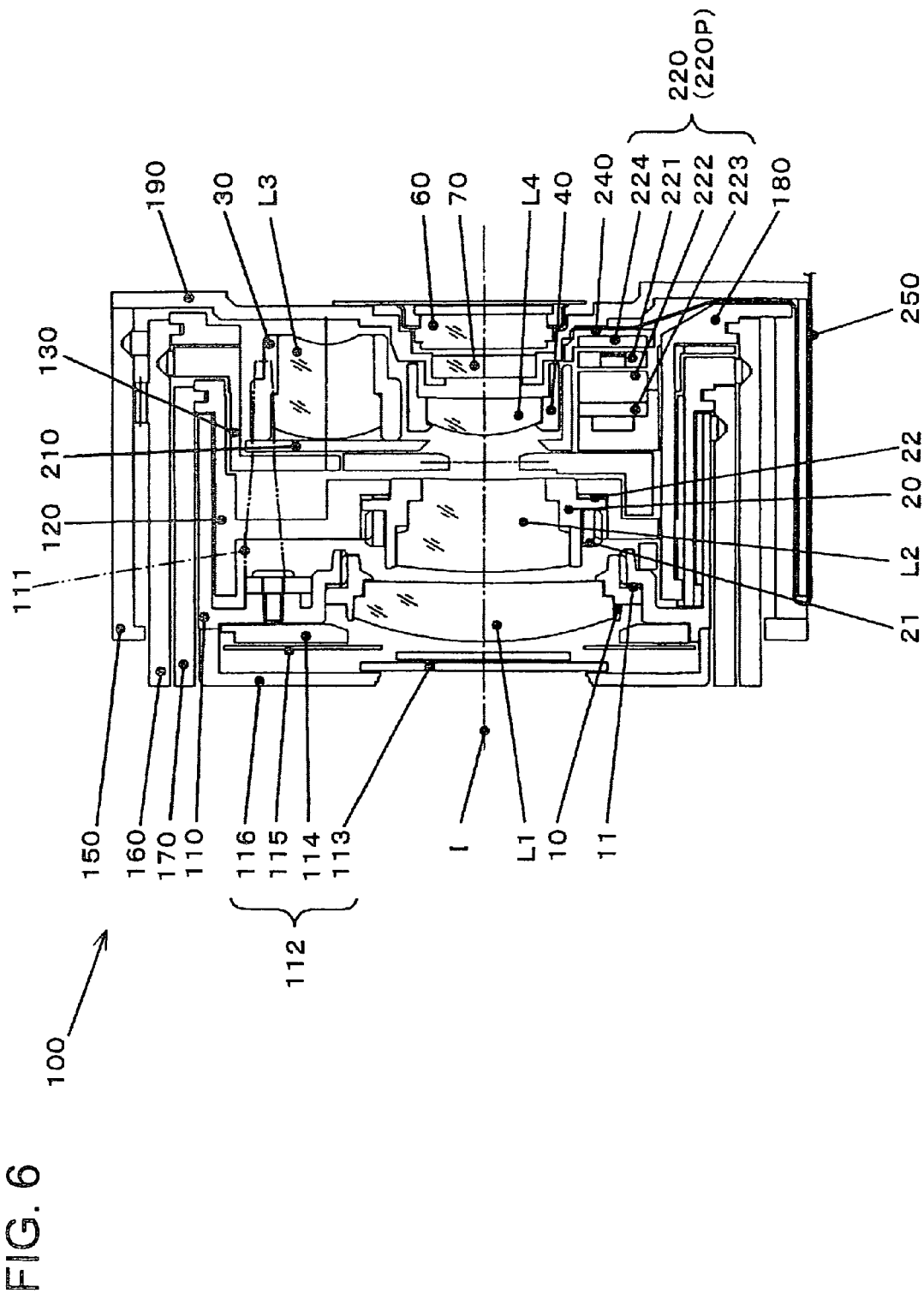
FIG. 6 is a sectional view of the lens barrel in FIG. 1 in the stored state.

FIG. 5 is a lateral section of the lens barrel 100 in the stored state. FIG. 6 is a sectional view of the lens barrel 100 in the stored state, taken across a plane that contains the optical axis.

The blur correction lens group L3 retreats from the optical axis I of the other lens groups as the pressure is applied to the cam face portion 34 at the blur correction lens group chamber 30, as shown in FIG. 5. When the retreating movement of the blur correction lens group L3 ends, the lens barrel 100 moves the first lens group barrel 110, the second lens group holding frame 120 and the blur correction lens group holding frame 130 further toward the image along the optical axis I. As a result, the fourth lens group L4 and the blur correction lens group L3, having retreated from the optical axis I, become positionally aligned alongside the fourth lens group L4 and the optical axis I, as shown in FIG. 6.

Figure 7:
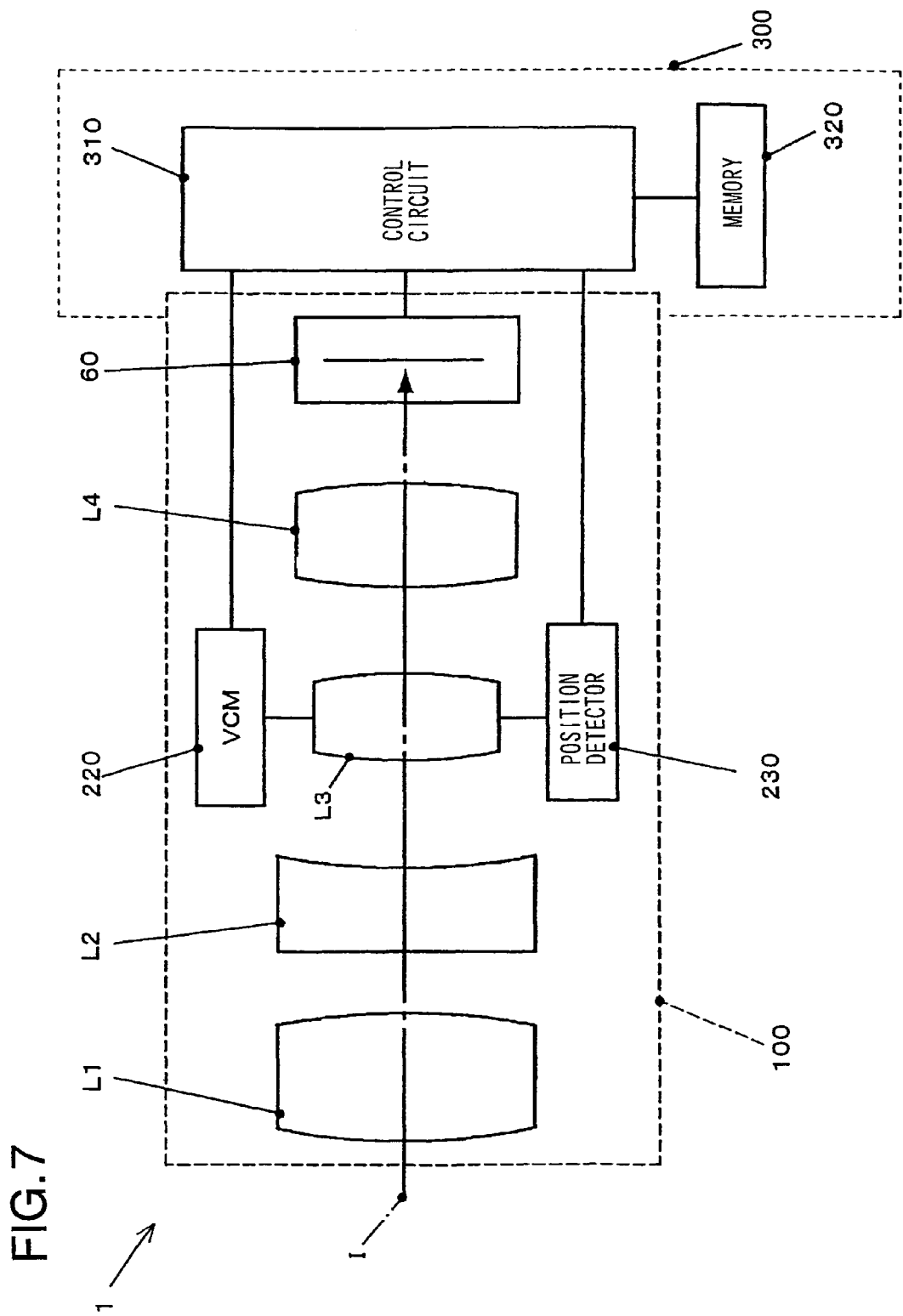
FIG. 7 shows the structure adopted in an embodiment of a camera equipped with the lens barrel shown in FIG. 1.

FIG. 7 shows the structure of a camera 1 equipped with the lens barrel 100 described above.

The camera 1 includes a control circuit 310 and a memory 320 in addition to the lens barrel 100. The control circuit 310 includes an MPU that individually controls the CCD 60, the VCM 220 and the position detectors 230, and executes exposure control, image processing, AF control, blur correction control and the like of the known art by controlling the entire camera 1 in a comprehensive manner. Reference position correction information used when driving the blur correction lens group L3 within the plane perpendicular to the optical axis I is held in the memory 320. When executing blur correction control, the control circuit 310 sets the center position for the blur correction lens group L3 based upon the correction information. The method adopted when generating the correction information is to be described in detail later. The control circuit 310 and the memory 320 are housed inside a camera body (not shown) at which the lens barrel 100 is mounted.

The method adopted when adjusting the lens barrel 100 in the camera 1 (correction information generation method) is explained.

First, a test chart, i.e., the subject, is placed on the objective side of the lens barrel 100 and a subject image of the test chart formed via the lens barrel 100 is captured with the CCD 60.

Figure 8A:
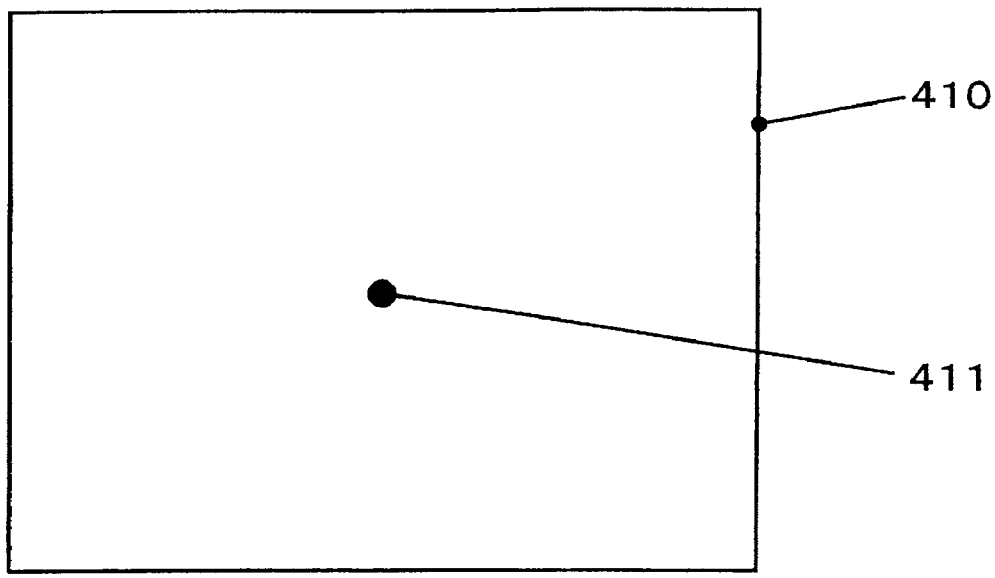
FIG. 8 presents examples of test charts that may be used when adjusting the lens barrel in FIG. 1.
Figure 8B:
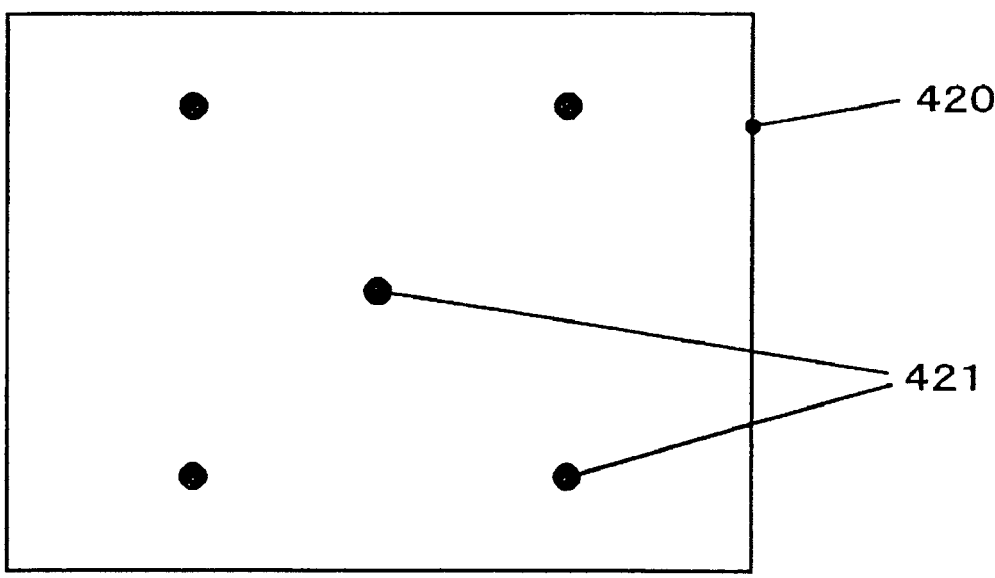

FIG. 8 presents examples of the test chart. The test chart may be, for instance, a rectangular sheet 410 formed in correspondence to the image angle of the image captured with the CCD 60 with a dot marking 411 set at the center thereof, as shown in FIG. 8A. Alternatively, the test chart may be a sheet 420 similar to the sheet 410 with dot markings 421 set at the center and the periphery thereof, as shown in FIG. 8B.

If the various lens groups in the lens barrel 100 are not decentered from the optical axis I to a significant extent, the image of the marking 411 or 421 at the center of the test chart, retaining a clean, desirable shape without becoming deformed, is set at the center of the image field. The extent of deformation or blurring occurring in the images of the markings 421 at the periphery of the test chart are small enough to be disregarded.

If, on the other hand, a lens group is decentered relative to the optical axis I, the image of the marking 411 or 421 at the center of the test chart becomes misaligned from the center of the image or the image becomes deformed. At the same time, the images of the markings 421 at the periphery become deformed or blurred to a significant extent.

The control circuit 310 outputs a control signal to the VCMs 220 to displace the blur correction lens group L3 by shifting it within the plane perpendicular to the optical axis, evaluates image signals output from the CCD 60 in sequence and detects the position of the blur correction lens group L3 at which the image signals are evaluated at the highest level when the image of the marking 411 or 421 is at the center of the test chart or the image is not deformed. Then, the control circuit 310 records into the memory 320 information indicating the position of the blur correction lens group L3 at which the image signals are evaluated at the highest level as correction information related to the reference position of the blur correction lens group L3, and then completes the adjustment of the lens barrel 100. Namely, as the blur correction lens group L3 is set at the reference position, the optical axis of the blur correction lens group L3 substantially coincides with that of the other lens groups, then the subject image enters the CCD 60 with its optical axis perpendicular to the CCD 60.

The correction information includes information indicating the direction of and the distance to the position described above, relative to the center position of the blur correction lens group L3 set in the initial state (pre-adjustment state). For instance, the correction information may include information indicating the coordinates of the position along the X direction (pitching direction) and the Y direction (yawing direction). Then, during an operation of the camera 1, the control unit 310 executes blur correction control by using the position ascertained based upon the correction information as the central position (reference position).

The following advantages are achieved in the first embodiment described above.

(1) Based upon the position of the blur correction lens group L3 when the best performance is yielded from the lens barrel 100, the control circuit 310 generates the reference position correction information for the blur correction lens group L3. This correction information, indicating the center position of the blur correction lens group L3 (the position assumed by the centered blur correction lens group), is used in the blur correction control. In other words, since the blur correction unit 200 can be utilized as an aligning mechanism unit that centers the blur correction lens group L3, the lens barrel 100 can be adjusted through a simple structure without having to provide a special aligning mechanism unit.

(2) Based upon image signals output from the CCD 60 while photographing the test chart, the control circuit 310 detects the position of the blur correction lens group L3 at which the best image quality is achieved and records the position thus detected as correction information into the memory 320. Then, the center position (reference position) can be set for the blur correction lens group L3 based upon the correction information, which allows the lens barrel 100 to be adjusted through a simple structure.

Second Embodiment

The lens barrel adjustment device achieved in the second embodiment of the present invention and the lens barrel adjustment method adopted in the lens barrel adjustment device are explained. The lens barrel adjusted in the second embodiment is similar to that explained in reference to the first embodiment.

This adjustment may be executed after assembling the lens barrel 100 before mounting the assembled lens barrel at the camera body 300 during, for instance, the camera manufacturing process, is performed by mounting the lens barrel 100 with the CCD 60 detached therefrom at an adjustment device 500 explained below.

Figure 9:
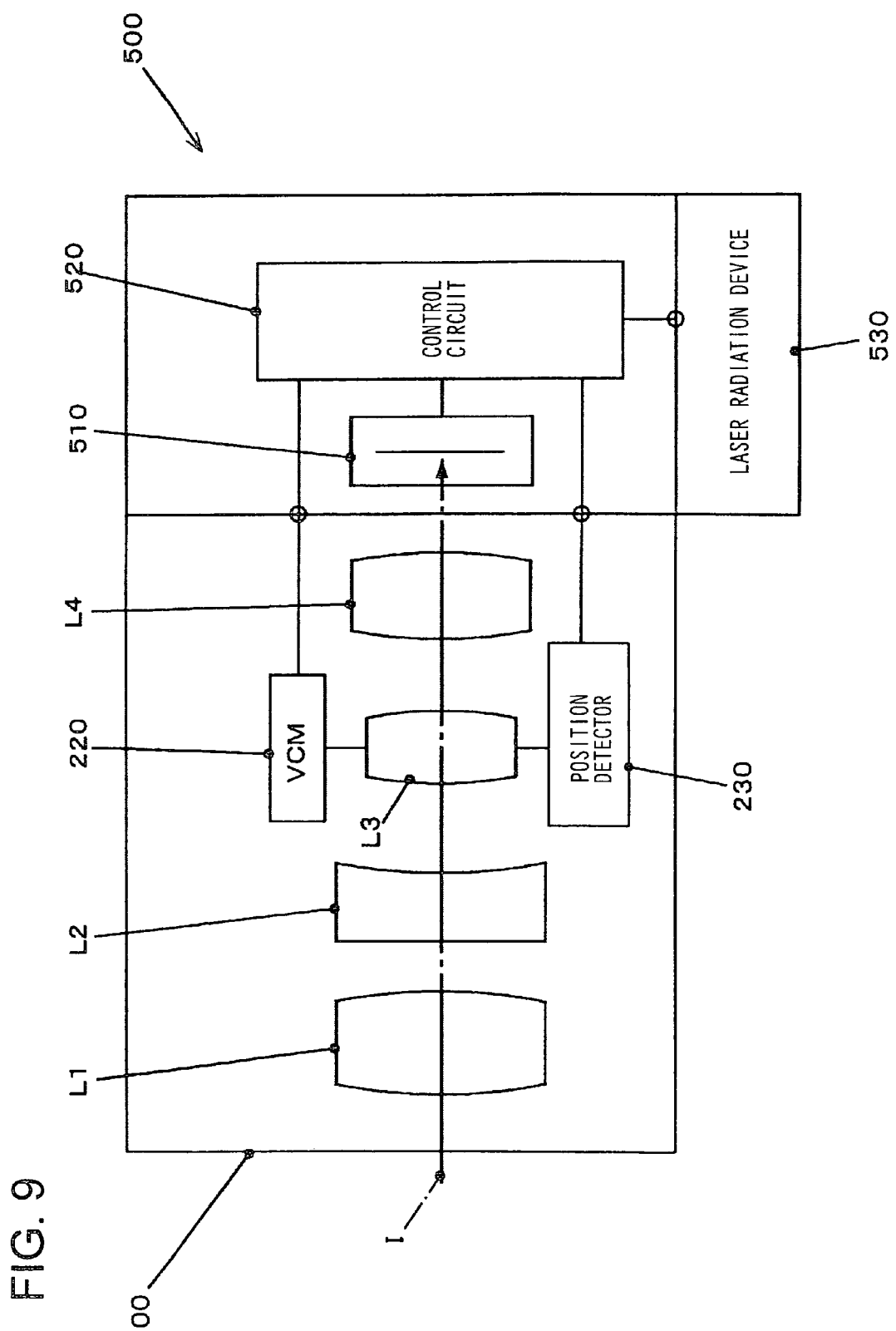
FIG. 9 shows the structure adopted in the lens barrel adjustment device achieved in a second embodiment of the present invention.

FIG. 9 shows the lens barrel 100 after the CCD 60 has been removed, mounted at the adjustment device 500. The adjustment device 500 includes a CCD 510, a control circuit 520 and a laser radiation device 530. The CCD 510 is a solid-state imaging element mounted in place of the CCD 60 at the lens barrel 100 at the position at which the CCD 60 is normally mounted. The control circuit 520 includes an MPU that individually controls the CCD 510 as well as the VCMs 220 and the position detectors 230 at the lens barrel 100. The control circuit 520 evaluates image signals output from the CCD 510 and generates correction information while driving the blur correction lens group L3 to shift the blur correction lens group by controlling the VCMs 220. The method adopted when generating the correction information is to be explained in detail later. The laser radiation device 530 is a recording unit that cuts the wiring formed on a flexible printed circuit board (FPC) 600 based upon the correction information generated by the control circuit 520 and records the correction information constituted of the cutting pattern on the FPC 600.

The following is an explanation of the method adopted when adjusting the lens barrel 100 by utilizing the adjustment device 500 described above.

First, the lens barrel 100 whiteout the CCD 60 is mounted at the adjustment device 500, as shown in FIG. 9. A test chart, i.e., the subject, is placed on the objective side of the lens barrel 100 and a subject image of the test chart formed via the lens barrel 100 is captured with the CCD 510.

The control circuit 520 displaces the blur correction lens group L3 by shifting it, evaluates image signals output from the CCD 510 in sequence, detects the position of the blur correction lens group L3 at which the image signals are evaluated at the highest level, and thus generates correction information, as does the control circuit 310 in the first embodiment. The control circuit 520 then outputs the correction information thus generated to the laser radiation device 530.

Figure 10A:
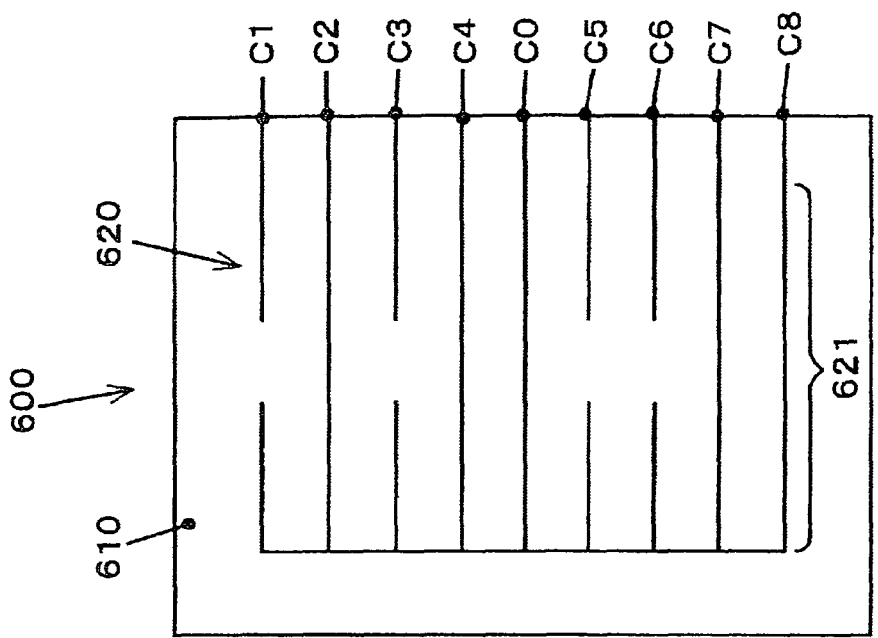
FIG. 10 shows the flexible printed circuit board on which correction information used in the lens barrel adjustment device in FIG. 2 is recorded.
Figure 10B:
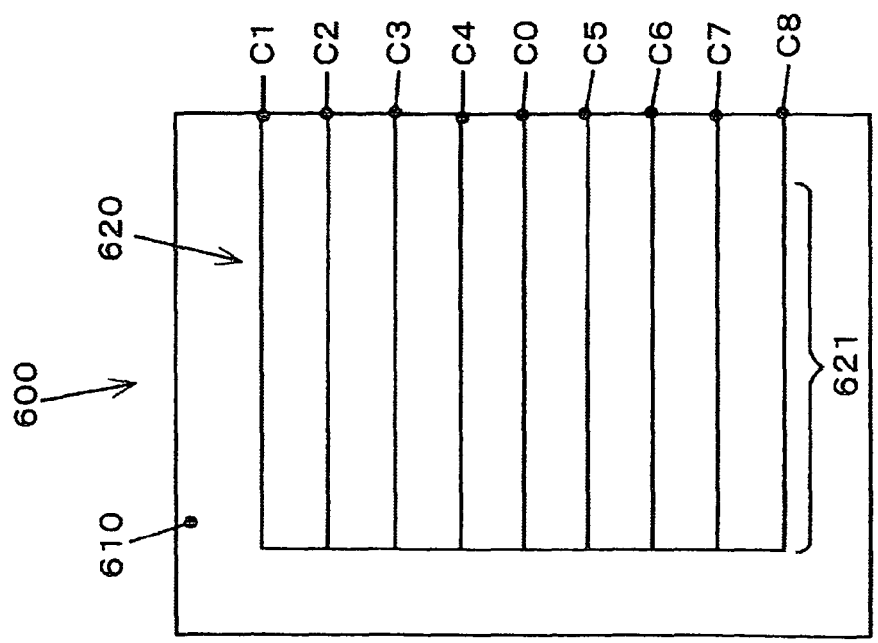

FIG. 10 shows the FPC 600, i.e., the recording medium in which the correction information is recorded by the laser radiation device 530, with FIG. 10(a) showing the FPC in the pre-recording state and FIG. 10(b) showing the FPC in the post-recording state. The FPC 600 includes a base portion 610 and a wiring portion 620. The base portion 610 is formed as a sheet constituted of a flexible material with an insulating property. The wiring portion 620 is a thin film constituted of a material achieving electrical conductivity, such as a metal, formed through etching or the like at the surface of the base portion 610. The wiring portion 620 may include, for instance, nine contact points C0~C8 set at an end edge of the base portion 610 and a land portion 621 that achieves mutual continuity among the contact points C0~C8. Based upon electrical continuity/non-continuity between the contact points C1~C4 and the contact point C0 and between the contact points C5~C8 and the contact point C0, correction information corresponding to the X direction and correction information corresponding to the Y direction are recorded as four-bit information at each of the contact points C1~C4 and the contact points C5 and C8.

The laser radiation device 530 cuts an area of the land portion 621 corresponding to a specific contact point with a laser so as to set each contact point either in a continuous state or a non-continuous state. For instance, the contact points C1, C3, C5 and C6 are set in the non-continuous state and the other contact points C2, C4, C7 and C8 are set in the continuous state in the example presented in FIG. 10(b).

The FPC 600 having undergone this processing is attached to a specific area of the outer surface of the lens barrel 100. A read device (not shown) which includes contact points (not shown) to achieve electrical continuity with the individual contact points C0~C8 as the lens barrel 100 is mounted, is provided at the camera body 300. Thus, by detecting the continuous/non-continuous states of individual contact points, the correction information inherent to the specific lens barrel 100 can be automatically transmitted to the control circuit 310 during the assembly process on, for instance, the production line at which the camera 1 is manufactured. The control circuit 310, in turn, executes the blur correction control based upon the correction information transmitted thereto.

In addition to advantages similar to those of the first embodiment described above, the second embodiment achieves the following advantage.

The adjustment device 500 records the correction information generated while adjusting the lens barrel 100 onto the FPC 600 in a format that allows the correction information to be read by the read device on the camera body side. Since the correction information can be automatically transmitted to the camera body side as the lens barrel 100 is mounted at the camera body during the camera assembly process, the camera assembly process is simplified.

Variations

The present invention is not limited to the embodiments described above and allows for a number of variations and modifications.

(1) While an explanation is given above on an example in which the blur correction optical system constitutes the retreatable optical system, the present invention is not limited to this example and may be adopted in a structure that includes a blur correction optical system and a retreatable optical system disposed independently of each other or in a structure in which part of the retreatable optical system is constituted with the blur correction optical system. For instance, in a structure that includes four lens groups, the second lens group may function as a blur correction lens group and the third lens group may be the retreatable lens group. In conjunction with this structure, the deterioration in the image quality attributable to misalignment of the retreatable optical system can be prevented by setting the reference position for the blur correction optical system so as to optimize the performance of the overall optical system.

Figure 11:
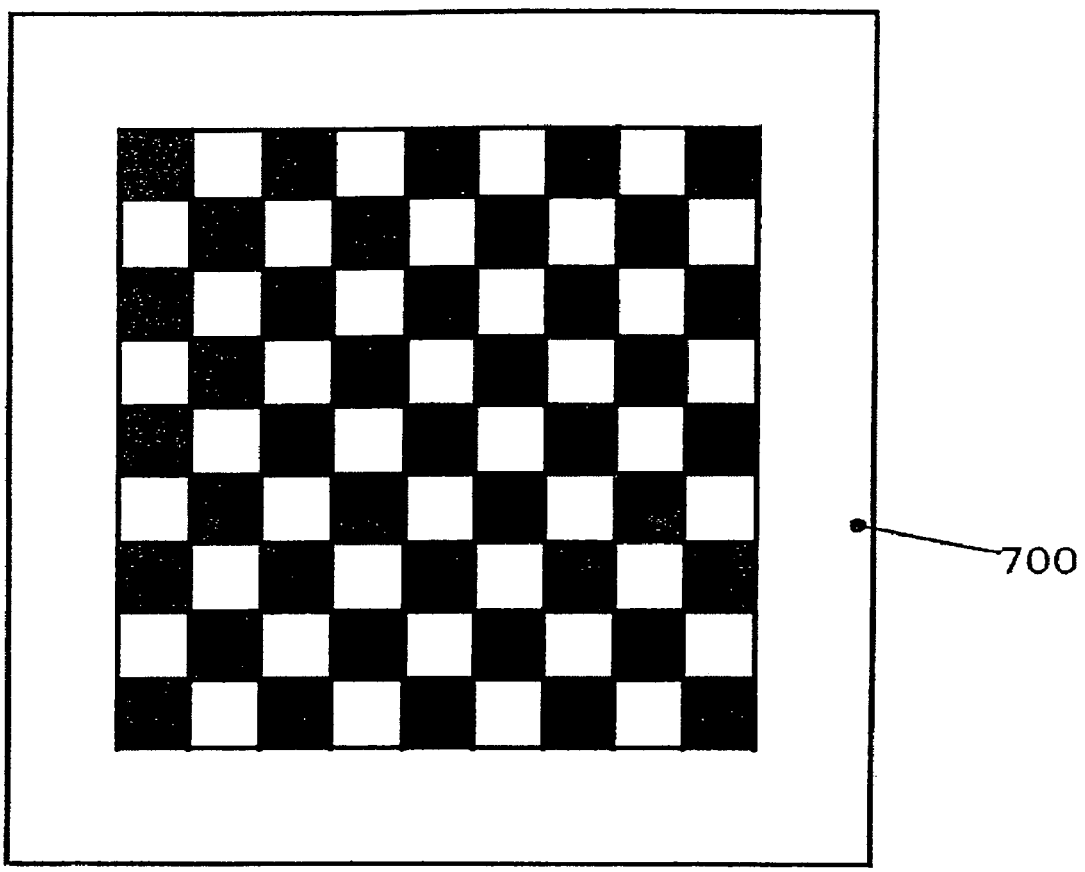
FIG. 11 shows a two-dimensional bar code representing another example of the recording unit at which the correction information is recorded.

(2) While the FPC 600, the land portion 621 of which can be cut via the laser radiation device 530, is used as the recording unit in the second embodiment a recording means other than this may be utilized, instead. For instance, a two-dimensional barcode 700 such as that shown in FIG. 11 may be used. Such a two-dimensional barcode 700 may be utilized in conjunction with a lens barrel adjustment device equipped with a printer for printing a two-dimensional barcode containing correction information instead of the laser radiation device 530 in the second embodiment and the printed barcode may be attached onto the lens barrel 100. As the lens barrel 100 is mounted at the camera, the correction information recorded as the two-dimensional barcode should be read by a barcode reader and the correction information thus read should be input to the memory within the camera via an input/output device of the known art capable of reading data from and writing data into memory.

Furthermore, if the lens barrel 100 is assigned with unit identification information such as a serial number, data correlating this unit identification information with the correction information may be recorded while adjusting the lens barrel 100 and the data may subsequently be retrieved and input as the lens barrel 100 is mounted at the camera.

(3) Instead of recording the correction information into the memory outside (on the camera body 300) of the lens barrel 100, the lens barrel 100 may include an internal memory where the correction information can be recorded.

(4) While the lens barrel 100 is a photographic lens barrel mounted in a digital still camera that does not allow the use of exchangeable lenses, the present invention is not limited to this example and it may be adopted in lens barrels mounted at cameras that allow the use of exchangeable lenses, for example cameras using a light sensitive film or a silver halide film and movie cameras as well. The lens barrel 100 used in such applications does not include the CCD 60, unlike the lens barrel 100 in the first embodiment. In the case of a digital camera or a movie camera that uses exchangeable lenses, the CCD 60 will be installed within the camera body.

The above described embodiments are examples, and various modifications can be made without departing from the spirit and scope of the invention.

What is claimed is:

1. A blur correction device, comprising:
a first member that is driven along an optical axis of an optical system;
a blur correction unit that is held by the first member and that includes a second member and a first drive unit driving the second member within a plane perpendicular to the optical axis of the optical system relative to the first member so as to correct an image blur, the second member including:
a blur correction optical system that corrects the image blur when the second member is driven within the plane perpendicular to the optical axis of the optical system during a photographing state;
a position fix member that holds the blur correction optical system at a predetermined position by contacting the blur correction optical system during the photographing state; and a second drive unit that supports the blur correction optical system and that is mounted on the second member so that the blur correction optical system is driven between a retreat position and the predetermined position relative to the second member, the blur correction optical system being retreated into the retreat position during a stored state and being held at the predetermined position by the position fix member during the photographing state;

a recording unit that records a reference position regarding the second member on that plane perpendicular to an optical axis; and a control unit that controls a position of the second member within the plane perpendicular to the optical axis of the optical system relative to the first member by the first drive unit during the photographing state so that the reference position coincides with a center position of the blur correction optical system, wherein when the second member is at the reference position, the blur correction optical system contacting the position fix member and the optical system other than the blur correction optical system are aligned.

2. The blur correction device according to claim 1, wherein a direction in which the second drive unit drives the blur correction optical system is parallel to a direction in which the first drive unit drives the second member relative to the first member.

3. The blur correction device according to claim 1, wherein
the position fix member is mounted at the predetermined position on the second member, and
the second drive unit drives the blur correction optical system by rotating the blur correction optical system around a rotating axis from the retreat position to the predetermined position in which the position fix member is mounted, the rotating axis being set parallel to the optical axis.

4. The blur correction device according to claim 1, further comprising:
a support member that supports the blur correction unit so that the blur correction unit moves along the optical axis, wherein
the blur correction unit moves along the optical axis between a photographic position in which photography is to be performed and a storage position in which photography cannot be performed.

5. A lens barrel, comprising:
the blur correction device according to claim 1.

6. A camera system, comprising:
the lens barrel according to claim 5; and
a camera body.

7. The camera system according to claim 6, wherein
the camera body includes an imaging unit that captures a subject image and outputs an image signal, and
the control unit records the reference position into the recording unit, the reference position being generated based upon the image signal.

8. A blur correction device, comprising:
a first member;
a blur correction unit that includes a second member and a first drive unit driving the second member relative to the first member so as to correct an image blur, the second member including:
a blur correction optical system that corrects the image blur;
a position fix member that holds the blur correction optical system at a predetermined position by contacting the blur correction optical system during a photographing state; and
a second drive unit that drives the blur correction optical system between a retreat position and the predetermined position, the blur correction optical system being retreated into the retreat position during a stored state and being held at the predetermined position by the position fix member during the photographing state;

a recording unit that records a reference position regarding the second member on a plane perpendicular to an optical axis;

a control unit that controls a position of the second member relative to the first member by driving the first drive unit during the photographing state so that the reference position coincides with a center position of the blur correction optical system; and a support member that supports the blur correction unit so that the blur correction unit moves along the optical axis, wherein when the second member is at the reference position, the blur correction optical system contacting the position fix member and an optical system other than the blur correction optical system are aligned, and the blur correction unit moves along the optical axis between a photographic position in which photography is to be performed and a storage position in which photography cannot be performed.

* * * * *